US012618720B2

(12) United States Patent　　(10) Patent No.: US 12,618,720 B2
Yoshihara et al.　　(45) Date of Patent: May 5, 2026

(54) TEMPERATURE SENSOR AND METHOD OF MANUFACTURING TEMPERATURE SENSOR

(71) Applicant: SHIBAURA ELECTRONICS CO., LTD., Saitama (JP)

(72) Inventors: Takamasa Yoshihara, Saitama (JP); Michiru Takemura, Semboku City (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 896 days.

(21) Appl. No.: 17/758,561

(22) PCT Filed: Oct. 14, 2021

(86) PCT No.: PCT/JP2021/038098
§ 371 (c)(1),
(2) Date: Apr. 20, 2023

(87) PCT Pub. No.: WO2023/062787
PCT Pub. Date: Apr. 20, 2023

(65) Prior Publication Data
US 2024/0219244 A1　　Jul. 4, 2024

(51) Int. Cl.
*G01K 7/22* (2006.01)
*G01K 1/10* (2006.01)
(52) U.S. Cl.
CPC ..................................... *G01K 7/22* (2013.01); *G01K 1/10* (2013.01)
(58) Field of Classification Search
CPC .. G01K 1/08; G01K 1/10; G01K 1/18; G01K 7/16; G01K 7/22
See application file for complete search history.

(56) References Cited

U.S. PATENT DOCUMENTS

| | | | | |
|---|---|---|---|---|
| 3,713,899 A | * | 1/1973 | Sebestyen ................ | G01K 7/04 |
| | | | | 136/201 |
| 4,934,831 A | * | 6/1990 | Volbrecht ................. | G01K 1/08 |
| | | | | 374/163 |

(Continued)

FOREIGN PATENT DOCUMENTS

| | | | | | |
|---|---|---|---|---|---|
| CN | 117897600 A | * | 4/2024 | ............... | G01K 7/22 |
| EP | 2779178 A1 | * | 9/2014 | ............... | H01C 1/02 |

(Continued)

OTHER PUBLICATIONS

Computer translation of CN 117897600 (Year: 2025).*

(Continued)

*Primary Examiner* — Randy W Gibson

(74) *Attorney, Agent, or Firm* — McDonald Hopkins LLC

(57) ABSTRACT

A temperature sensor includes: a thermosensitive element including a thermosensitive body, an extension wire having one end electrically connected to the thermosensitive body, and a sealing body made of an insulation material and covering a part of the extension wire and the thermosensitive body; a lead wire electrically connected to another end of the extension wire; and a covering body made of a resin and having a long shape and a rectangular cross-section, the covering body covering a part of the lead wire and the thermosensitive element. In a lateral direction of the covering body, a dimension of a region of the covering body covering the thermosensitive element is set less than a dimension of a region of the covering body covering the lead wire.

7 Claims, 10 Drawing Sheets

(56) References Cited

U.S. PATENT DOCUMENTS

| | | | | |
|---|---|---|---|---|
| 6,756,585 | B2 * | 6/2004 | Damaschke | ......... G01D 11/245 |
| | | | | 338/30 |
| 10,156,483 | B2 | 12/2018 | Yoshihara et al. | |
| 2009/0110029 | A1 * | 4/2009 | Bradley | .............. A61M 16/024 |
| | | | | 374/208 |
| 2015/0063423 | A1 | 3/2015 | Hua | |
| 2016/0178445 | A1 | 6/2016 | Shiraki et al. | |
| 2017/0016777 | A1 | 1/2017 | Yoshihara et al. | |
| 2019/0265108 | A1 | 8/2019 | Yoshihara et al. | |
| 2019/0386437 | A1 | 12/2019 | Matsunaga et al. | |
| 2025/0146882 | A1 * | 5/2025 | Yoshihara | ................ G01K 7/22 |

FOREIGN PATENT DOCUMENTS

| | | | | |
|---|---|---|---|---|
| JP | 2006-234632 | A | 9/2006 | |
| JP | 2012-211792 | A | 11/2012 | |
| JP | 5830636 | B | 10/2015 | |
| JP | 2016-536565 | A | 11/2016 | |
| JP | 2019-219200 | A | 12/2019 | |
| JP | 7058377 | B1 * | 4/2022 | .............. G01K 1/10 |
| WO | 2015132832 | A1 | 9/2015 | |
| WO | WO-2017081958 | A1 * | 5/2017 | .............. G01K 1/08 |
| WO | 2018167903 | A1 | 9/2018 | |
| WO | 2019082618 | A1 | 5/2019 | |
| WO | WO-2019151167 | A1 * | 8/2019 | .............. G01K 1/08 |

OTHER PUBLICATIONS

Computer translation of JP 7058377 (Year: 2025).*
Computer translation of WO 2017081958 (Year: 2025).*
Computer translation of WO 201915167 (Year: 2025).*
Computer translation of JP_2012211792_A (Year: 2025).*
Office Action for Application No. 112021000268.6, dated Jul. 21, 2025, 7 pages, German Patent and Trademark Office.
Chinese Office Action issued in Chinese Patent Application No. 202180007329.9 dated Jan. 21, 2026.
International Search Report (PCT/ISA/210 and PCT/ISA/237) for PCT/JP2021/038098 dated Nov. 16, 2021.
JP2021-576540 Office action dated Jan. 26, 2022 and translation thereof.

* cited by examiner

FIG. 4A
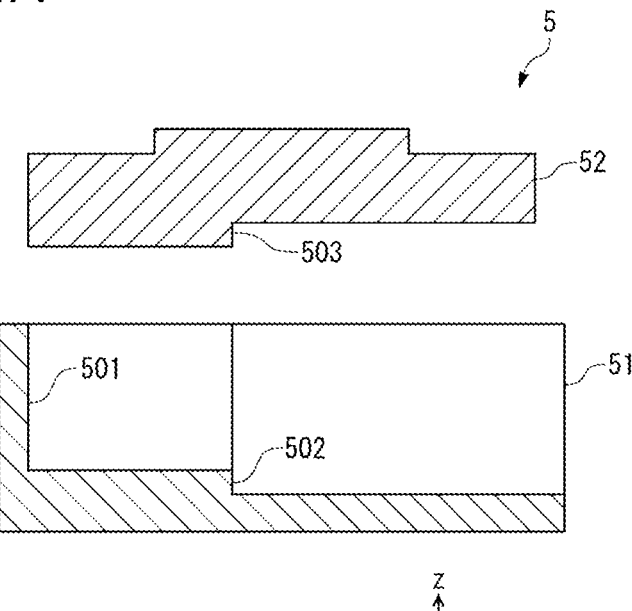
FIG. 4B
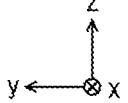
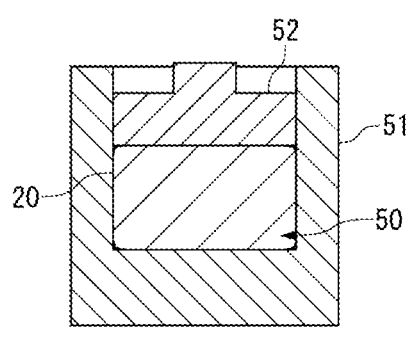
FIG. 4C

FIG. 8A
FIG. 8B
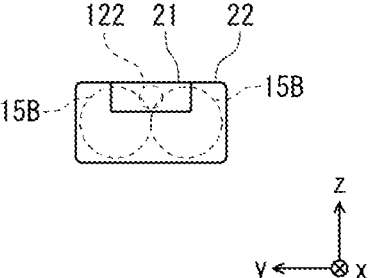
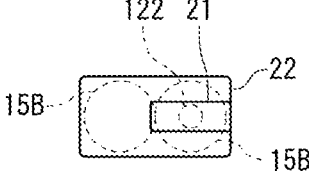

TEMPERATURE SENSOR AND METHOD OF MANUFACTURING TEMPERATURE SENSOR

CROSS-REFERENCE TO RELATED APPLICATIONS

This is a National Stage application of PCT international application PCT/JP2021/038098, filed on Oct. 14, 2021, the contents of which is incorporated herein by reference in its entirety.

TECHNICAL FIELD

The present invention relates to a temperature sensor and a method of manufacturing the temperature sensor.

BACKGROUND ART

A temperature sensor including a thermosensitive element such as a thermistor is widely used (for example, Patent Literature 1). To protect the thermosensitive element from, for example, a surrounding environment, a covering body made of a resin material is provided for the thermosensitive element and a predetermined range of a lead wire connected to the thermosensitive element.

A temperature sensor disclosed in Patent Literature 1 includes a covering body that includes an inner layer and an outer layer and is formed in a rectangular-parallelepiped shape. The outer layer is higher in melting point than the inner layer and has heat shrinkability. Such a covering body includes an inside tube housing the thermosensitive element and an outside tube to be externally inserted into the inside tube, and is formed to have a constant thickness enough to house a lead wire in the covering body by, for example, heat processing and press processing.

CITATION LIST

Patent Literature

Patent Literature 1: JP 5830636 B2

SUMMARY OF INVENTION

Technical Problem

With improvement in performance of an apparatus on which the temperature sensor is to be mounted, performance improvement of the temperature sensor is constantly required. The covering body covering the thermosensitive element and the predetermined range of the lead wire influences on responsiveness of the temperature sensor. In particular, in a small-sized temperature sensor, the covering body largely influences on the responsiveness.

Therefore, a first objective of the present invention is to provide a temperature sensor that can further improve responsiveness, and a method of manufacturing the temperature sensor.

Further, since a thickness of the temperature sensor is determined with a diameter of a lead wire as a reference, it is difficult to install the temperature sensor depending on a shape and a dimension of an object on which the temperature sensor is installed. Therefore, together with or in place of the first objective, a second objective of the present invention is to provide a temperature sensor that can improve installation flexibility, and a method of manufacturing the temperature sensor.

Solution to Problem

A temperature sensor according to the present invention includes: a thermosensitive element including a thermosensitive body, an extension wire having one end electrically connected to the thermosensitive body, and a sealing body that is made of an insulation material and covers a part of the extension wire and the thermosensitive body; a lead wire electrically connected to another end of the extension wire of the thermosensitive element; and a covering body that is made of a resin and has a long shape and a rectangular cross-section, the covering body covering a part of the lead wire and the thermosensitive element. In a lateral direction of the covering body, a dimension of a region of the covering body covering the thermosensitive element is set less than a dimension of a region of the covering body covering the lead wire.

In the temperature sensor according to the present invention, the lead wire preferably includes a core wire connected to the extension wire and a covering provided around the core wire, and in the lateral direction of the covering body, the dimension of the region of the covering body covering the thermosensitive element is preferably set less than an outer diameter of the covering of the lead wire.

In the temperature sensor according to the present invention, the lateral direction is preferably at least one of a first direction and a second direction orthogonal to the first direction, in the rectangular cross-section.

In the temperature sensor according to the present invention, either one of the region of the covering body covering the thermosensitive element and the region of the covering body covering the lead wire is preferably formed in a rectangular-parallelepiped shape.

In the temperature sensor according to the present invention, in a first direction in the rectangular cross-section, a dimension of the region of the covering body covering the thermosensitive element is preferably set less than a dimension of the region of the covering body covering the lead wire, and in a second direction orthogonal to the first direction in the rectangular cross-section, a dimension of the region of the covering body covering the thermosensitive element is preferably set less than a dimension of the region of the covering body covering the lead wire.

In the temperature sensor according to the present invention, a pair of the extension wires of the thermosensitive element are preferably drawn out toward one side from the thermosensitive body, the sealing body is preferably disposed in the region of the covering body covering the thermosensitive element, and a joint portion of each of the extension wires and the respective lead wire is preferably disposed in the region of the covering body covering the lead wire.

In the temperature sensor according to the present invention, each of the region of the covering body covering the thermosensitive element and the region of the covering body covering the lead wire preferably has a rectangular cross-section, and a center of the cross-section of the region of the covering body covering the thermosensitive element and a center of the cross-section of the region of the covering body covering the lead wire are preferably coincident with each other.

In the temperature sensor according to the present invention, the dimension in the lateral direction of the region of the covering body covering the thermosensitive element is preferably reduced toward an end of the covering body.

Further, in the temperature sensor according to the present invention, there is provided a method of manufacturing a temperature sensor that includes a thermosensitive element including a thermosensitive body, a lead wire connected to the thermosensitive element, and a covering body that is made of a resin and has a long shape, the covering body covering a part of the lead wire and the thermosensitive element.

Such a method includes: a housing step of housing the part of the lead wire and the thermosensitive element inside a material made of a resin; a heating step of heating the material; and a pressure forming step of pressurizing the material to form the material in a shape having a rectangular cross-section.

In the pressure forming step, in a lateral direction of the covering body, a dimension of a region of the covering body covering the thermosensitive element is set less than a dimension of a region of the covering body covering the lead wire by deforming, by pressurization, the material on the thermosensitive element side by a deformation amount greater than a deformation amount of the material on the lead wire side.

Advantageous Effects of Invention

Since, in the lateral direction of the covering body, the dimension of the region of the covering body covering the thermosensitive element is set less than the dimension of the region of the covering body covering the lead wire, a thickness of the covering body on the thermosensitive element side can be appropriately set based on a shape and a dimension of an installation place such as a narrow groove, irrespective of an outer diameter of the lead wire. This makes it possible to improve installation flexibility of the temperature sensor.

In addition, when the dimension in the lateral direction of the covering body on the thermosensitive element side is less than the dimension in the lateral direction of the covering body on the lead wire side determined with the outer diameter of the covering of the lead wire as a reference, a heat capacity of the covering body is small and the wall thickness of the covering body between the thermosensitive body and a temperature measurement object on which the covering body is disposed is small, as compared with a case where the covering body has a constant dimension over the entire length with the outer diameter of the lead wire as a reference and a case where the dimension of the covering body on the thermosensitive element side is greater than the dimension of the covering body on the lead wire side. Therefore, the thermosensitive body can more sensitively detect the temperature change of the object. This makes it possible to improve responsiveness of the temperature sensor.

BRIEF DESCRIPTION OF DRAWINGS

FIG. 4A is a cross-sectional view of a mold used to manufacture the temperature sensor, and FIG. 4B and FIG. 4C are cross-sectional views illustrating change in shape of a tube in a manufacturing process.

FIG. 8A and FIG. 8B are diagrams each illustrating a covering body according to still another modification of the present invention as viewed from a front side.

DESCRIPTION OF EMBODIMENT

Figure 1A:
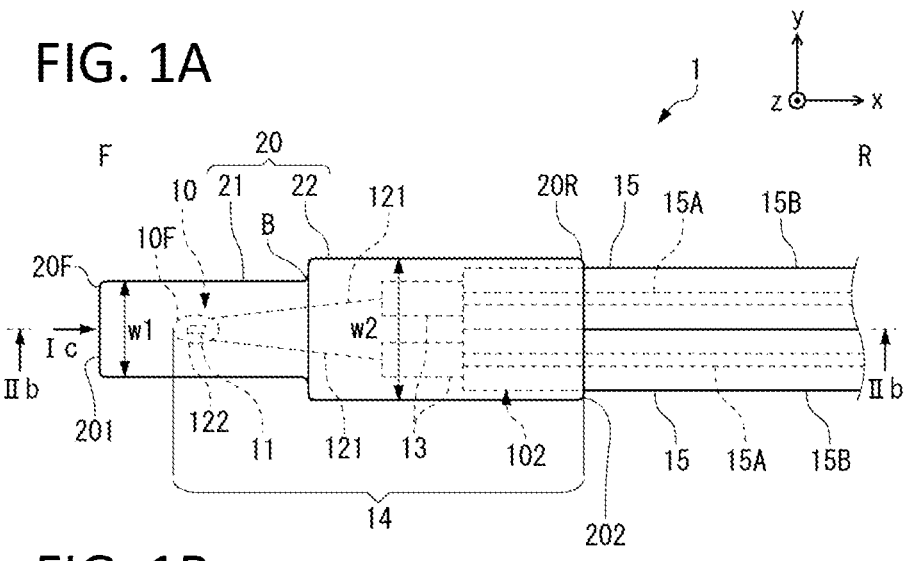
FIG. 1A, FIG. 1B and FIG. 1C are diagrams illustrating a temperature sensor according to an embodiment of the present invention, FIG. 1A being a plan view, FIG. 1B being a side view, and FIG. 1C being a diagram as viewed from a direction Ic in FIG. 1A.

An embodiment of the present invention is described below with reference to accompanying drawings.

Embodiment

First, a configuration of a temperature sensor 1 illustrated in FIG. 1A, FIG. 1B, FIG. 1C and FIG. 2 is described.

The temperature sensor 1 includes a thermosensitive element 10 including a thermosensitive body 11, lead wires 15 each connected to the thermosensitive element 10, and a long covering body 20 provided for parts of the lead wires 15 and the thermosensitive element 10. The covering body 20 is a formed body made of a resin, and has a rectangular cross-section. The temperature sensor 1 is disposed on various object 3 and is used to measure a temperature. The present embodiment provides the temperature sensor 1 that has a small size and is further improved in responsiveness.

In the present specification, a direction in which the lead wires 15 are drawn out from the thermosensitive element 10 is defined as an x-direction (drawing direction). Further, a thermosensitive element side of the temperature sensor 1 in the present embodiment is defined as a "front side", and the lead wire 15 side of the temperature sensor 1 is defined as a "rear side". The x-direction (drawing direction) corresponds to a front-rear direction. In FIG. 1A and other drawings, the front side is denoted by F, and the rear side is denoted by R.

A longitudinal direction of the covering body 20 corresponds to the x-direction. A lateral direction of the covering body 20 corresponds to at least one of a y-direction and a z-direction orthogonal to the x-direction.

In a planar view (FIG. 1A) of the temperature sensor 1 according to the present embodiment, two lead wires 15 are disposed. In contrast, in a side view (FIG. 1B) of the temperature sensor 1, one lead wire 15 is disposed. In the planar view of the temperature sensor 1, a direction in which the two lead wires 15 are arranged side by side is defined as the y-direction (width direction), and a direction orthogonal to both of the x-direction and the y-direction is defined as the z-direction (thickness direction). A first direction in the rectangular cross-section of the covering body 20 corresponds to the z-direction (thickness direction), and a second direction orthogonal to the first direction corresponds to the y-direction (width direction).

Further, a dimension in the y-direction is defined as a "width", and a dimension in the z-direction is defined as a "thickness".

Figure 1B:
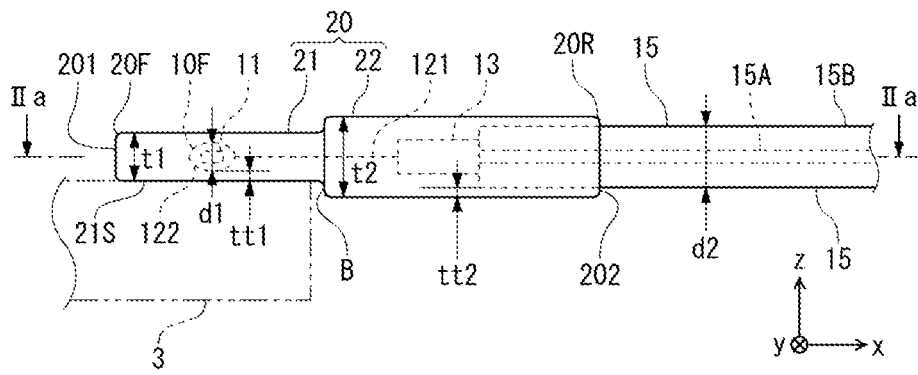

The temperature sensor 1 according to the present embodiment has main characteristics that, as a dimension of the covering body 20 in the lateral direction, a dimension of a thermosensitive element covering region 21 covering the thermosensitive element 10 is less than a dimension of an electric wire covering region 22 covering the lead wires 15 (see FIG. 1A and FIG. 1B).

(Thermosensitive Element)

As illustrated in FIG. 1A, FIG. 1B, FIG. 1C and FIG. 2, the thermosensitive element 10 includes the thermosensitive body 11, extension wires 121 each having one end electrically connected to the thermosensitive body 11, and a sealing body 122 that is made of an insulation material and covers parts of the extension wires 121 and the thermosensitive body 11.

The thermosensitive body 11 includes temperature characteristics to electric resistance, and is, for example, a thermistor. Each of the paired extension wires 121 is connected to an unillustrated electrode of the thermosensitive body 11, and is drawn out rearward from the thermosensitive body 11. The extension wires 121 are, for example, Dumet wires. The paired extension wires 121 are drawn out to an outside of the sealing body 122 that is made of an insulation material such as glass and seals the thermosensitive body 11. The thermosensitive body 11 is connected to an unillustrated temperature measurement circuit by the extension wires 121 and the lead wires 15. A temperature of the object 3 on which the thermosensitive body 11 is disposed can be measured by the thermosensitive element 10 and the temperature measurement circuit.

Each of the paired lead wires 15 includes a core wire 15A such as a twisted wire, and an insulation covering 15B covering the core wire 15A. The core wires 15A are joined with the respective extension wires 121 by welding or the like. The insulation coverings 15B are made of a fluorine resin such as PTFE (polytetrafluoroethylene).

The lead wires 15 are connected to the unillustrated temperature measurement circuit through other electric wires as necessary.

Joint portions 13 illustrated in FIG. 1A, FIG. 1B, FIG. 1C and FIG. 2 are schematically illustrated as portions where the core wires 15A of the lead wires 15 are joined with the respective extension wires 121. The core wires 15A of the lead wires 15 and the extension wires 121 are joined by, for example, welding such as laser welding and resistance welding, or soldering. The core wires 15A of the lead wires 15 and the extension wires 121 can be connected by using crimp terminals.

(Covering Body)

The covering body 20 covers parts of the lead wires 15 and the thermosensitive element 10, to protect the thermosensitive element 10 and the lead wires 15 from the surrounding environment, external force, and the like. The thermosensitive element 10 is sealed in the covering body 20. Therefore, the thermosensitive element 10 is disposed on the object 3 through the covering body 20.

A covered range 14 of the thermosensitive element 10 covered with the covering body 20 includes the whole of the thermosensitive element 10, and at least portions of the paired lead wires 15 where the paired core wires 15A are exposed from the insulation coverings 15B.

A front end 20F of the covering body 20 is positioned forward of a front end 10F of the thermosensitive element 10. A rear end 20R of the covering body 20 is positioned rearward of front ends of the insulation coverings 15B.

In the present embodiment, a dimension (length) of the covering body 20 in the x-direction is greater than a dimension (width) in the y-direction and a dimension (thickness) in the z-direction. The dimensions of the covering body 20 are not limited thereto, and for example, the width may be greater than the length.

The covering body 20 includes the thermosensitive element covering region 21 that is formed in a rectangular-parallelepiped shape and covers the thermosensitive element 10, and the electric wire covering region 22 that is formed in a rectangular-parallelepiped shape and covers the lead wires 15. The thermosensitive element covering region 21 and the electric wire covering region 22 are integrally formed.

The covering body 20 is made of a fluorine resin such as PTFE and PFA (tetrafluoroethylene-perfluoroalkylvinylether copolymer), and has heat shrinkability.

A thickness of the thermosensitive element covering region 21 is set to a thickness t1 that is sufficient to cover the whole of the thermosensitive body 11 with a dimension d1 of an outer shape of the thermosensitive body 11 as a reference.

A thickness of the electric wire covering region 22 is set to a thickness t2 that is sufficient to cover the entire circumference of the insulation coverings 15B with the maximum outer diameter of the single lead wire 15, namely, an outer diameter d2 of the single insulation covering 15B as a reference. An inner diameter of the covering body 20 is set close to outer diameters of the insulation coverings 15B.

The thickness t1 of the thermosensitive element covering region 21 is set thinner than the thickness t2 of the electric wire covering region 22. This is based on a dimensional difference between objects as references of the thermosensitive element covering region 21 and the electric wire covering region 22. In other words, the dimension d1 of the outer shape of the thermosensitive body 11 is less than the outer diameter d2 of each of the insulation coverings 15B. Therefore, the thickness t1 is thinner than the thickness t2.

In addition, the dimension d1 of the outer shape of the thermosensitive body 11 according to the present embodiment is sufficiently less than the outer diameter d2 of each of the insulation coverings 15B. Therefore, the thickness t1 of the whole of the thermosensitive element covering region 21 that is obtained by adding a wall thickness of a resin portion to the dimension d1 of the outer shape of the thermosensitive body 11 is thinner than the outer diameter d2 of each of the insulation coverings 15B.

A diameter of each of the extension wires 121 according to the present embodiment is set less than the dimension d1 of the outer shape of the thermosensitive body 11. A boundary B between the thermosensitive element covering region 21 and the electric wire covering region 22 can be set in, for example, a section where the extension wires 121 extend from the thermosensitive body 11 to the joint portions 13.

The thermosensitive element covering region 21 at least includes the thermosensitive body 11 and the sealing body 122. The electric wire covering region 22 at least includes the joint portions 13 and the ends of the insulation coverings 15B. Since the electric wire covering region 22 greater in thickness than the thermosensitive element covering region 21 includes the joint portions 13, it is possible to seal welding portions, solder, the crimp terminals, and the like in a resin irrespective of joining means.

The thermosensitive element covering region 21 and the electric wire covering region 22 have different thicknesses t1 and t2, and different widths as well. A width of the thermosensitive body 11 is less than a sum of the widths of the paired lead wires 15 arranged side by side in the y-direction. Therefore, a width w1 of the thermosensitive element covering region 21 with the width of the thermosensitive body 11 as a reference is set narrower than a width w2 of the electric wire covering region 22 with the total width of the paired lead wires 15 as a reference.

Figure 1C:
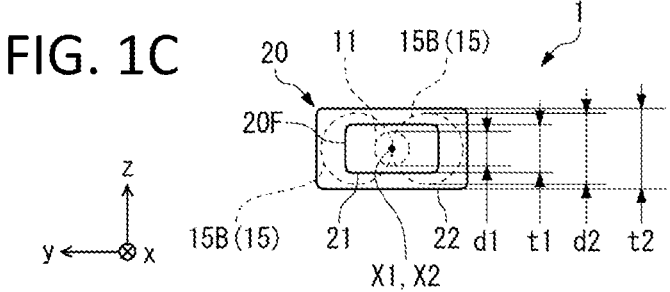
Figures 2A, 2B:
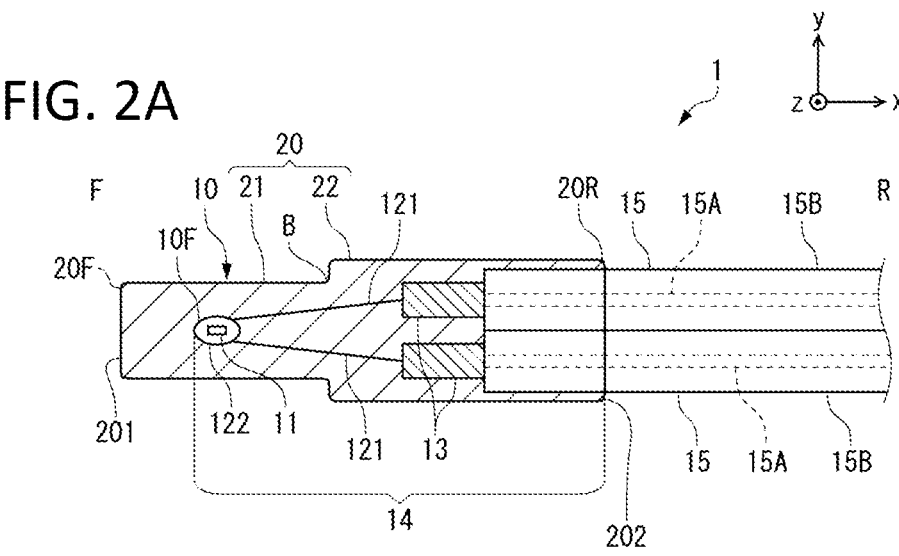
FIG. 2A is a cross-sectional view taken along line IIa-IIa in FIG. 1B.
FIG. 2B is a cross-sectional view taken along line IIb-IIb in FIG. 1A.

As illustrated in FIG. 1C, a center X1 of the rectangular cross-section of the thermosensitive element covering region 21 and a center X2 of the rectangular cross-section of the electric wire covering region 22 are coincident with each other. At this time, in the side view (FIG. 1B) of the temperature sensor 1, each of the paired lead wires 15 is linearly drawn out rearward from the thermosensitive element 10. In addition, in the planar view (FIG. 1A) of the temperature sensor 1, the paired lead wires 15 are arranged symmetrically about a center line that passes through the thermosensitive body 11 and extends in the x-direction.

(Method of Manufacturing Temperature Sensor)

An example of a procedure of manufacturing the temperature sensor 1 is described with reference to FIG. 3A and FIG. 4C.

Although dimensions of outer shapes of the thermosensitive element covering region 21 and the electric wire covering region 22 are different from each other, the temperature sensor 1 according to the present embodiment can be manufactured by using a single tube 4 that has a constant diameter and is continuously disposed over the thermosensitive element 10 side and the lead wire 15 side.

The core wires 15A of the lead wires 15 are joined with the respective extension wires 121 drawn out from the sealing body 122 of the thermosensitive body 11 in advance (lead wire joining step S00).

Manufacturing steps performed after the thermosensitive element 10 and the cylindrical tube 4 are prepared are described below.

Figure 3A:
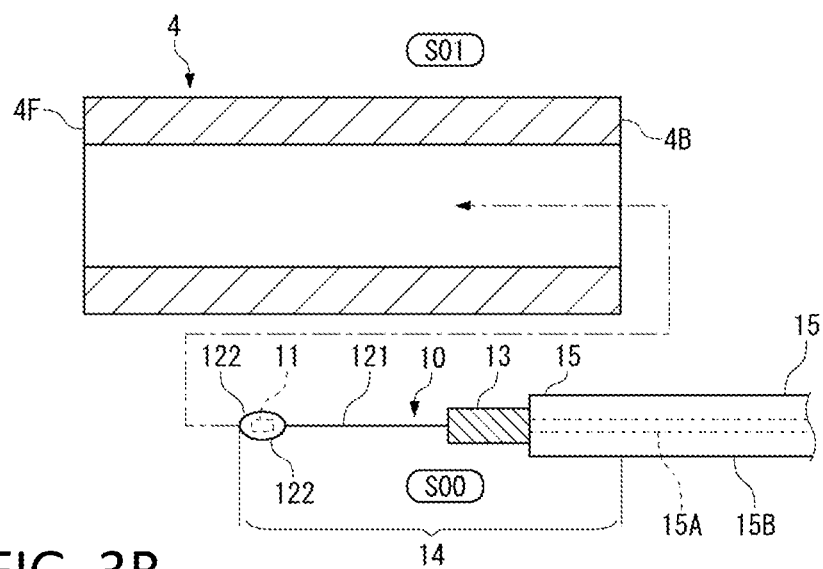
FIG. 3A to FIG. 3C are diagrams to explain steps of manufacturing the temperature sensor.

First, as illustrated in FIG. 3A, the thermosensitive element 10 and parts of the lead wires 15 are housed inside the tube 4 by inserting the thermosensitive element 10 into the tube 4 from the thermosensitive body 11 side (thermosensitive element housing step S01). At this time, the covered range 14 including the front end 10F of the thermosensitive element 10 and the front ends of the insulation coverings 15B is disposed inside the tube 4.

Figure 3B:
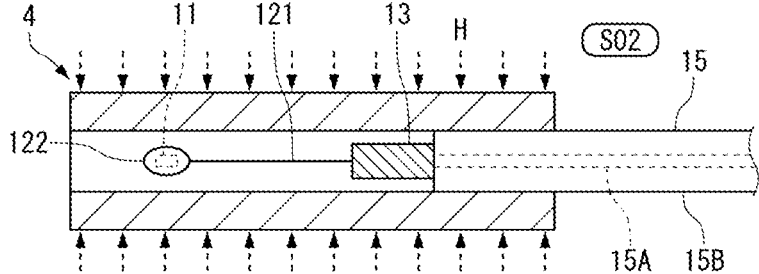

Next, as illustrated in FIG. 3B, heat H is applied to the tube 4 from an outside, to heat the tube 4 to a predetermined temperature (heating step S02). As a method of heating the tube 4, for example, hot air may be blown to the tube 4 by a heat gun, or the tube 4 and the covered range 14 may be put in an electric furnace.

At this time, the tube 4 is heated to a temperature that is a temperature necessary for thermal shrinkage and is less than a melting point, and is thermally shrunk. For example, in a case where the tube 4 is made of PTFE, the tube 4 is heated to a temperature close to 327° C. that is a melting point of PTFE, for example, to 380° ° C.

The tube 4 is softened and thermally shrunk by heating, and is accordingly reduced in diameter. The tube 4 having the constant diameter is shrunk at a predetermined rate corresponding to a material over the entire length. At this time, the inside of the tube 4 is in tight contact with the lead wires 15 but is not necessarily in tight contact with the thermosensitive element 10 due to difference in diameter of the outer shape between the thermosensitive element 10 and the lead wires 15.

Figure 3C:
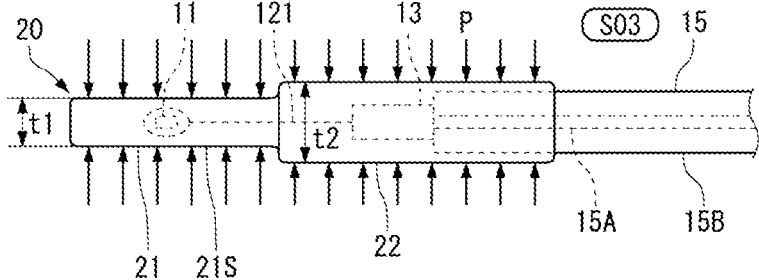

Subsequent to the heat processing, as illustrated in FIG. 3C, pressure P is applied to the tube 4 from the outside in a state where the tube 4 is softened, to form the tube 4 in the shape of the covering body 20 (pressure forming step S03). For example, the cross-sections of the tube 4 and the covered range 14 are each changed from a substantially circular shape to a rectangular shape by press processing as pressurization processing using a mold 5 illustrated in FIGS. 4A to 4C. Thereafter, the resin is cured by heat dissipation to the mold 5 and the like. As a result, the covering body 20 is formed.

FIG. 4A to FIG. 4C schematically illustrate an example of the mold 5.

In a lower mold 51 and an upper mold 52, steps 502 and 503 in the z-direction corresponding to the thickness difference between the thermosensitive element covering region 21 and the electric wire covering region 22, and unillustrated steps in the y-direction corresponding to the width difference between the thermosensitive element covering region 21 and the electric wire covering region 22 are formed.

FIG. 4C illustrates an example of cross-sections of the lower mold 51 and the upper mold 52. As illustrated in FIG. 4C, a cavity 50 having a shape corresponding to the outer shape of the covering body 20 is formed between the lower mold 51 and the upper mold 52.

The tube 4 on the thermosensitive element 10 side is strongly pressurized in the z-direction and the y-direction by the pressurization processing as compared with the lead wire 15 side, and is compressed and deformed. A deformation amount in the z-direction is different between the tube 4 on the thermosensitive element 10 side and the tube 4 on the lead wire 15 side. As a result, the thermosensitive element covering region 21 that is relatively thin and the electric wire covering region 22 that is relatively thick are formed. As for the width, a deformation amount in the y-direction is different between the tube 4 on the thermosensitive element 10 side and the tube 4 on the lead wire 15 side. As a result, the thermosensitive element covering region 21 that is relatively narrow and the electric wire covering region 22 that is relatively wide are formed.

When the magnitude of the pressure P applied to the tube 4 from the mold 5 is adjusted and design values of the thicknesses and the widths of the thermosensitive element covering region 21 and the electric wire covering region 22 are adjusted under the same pressure, it is possible to adjust the deformation amounts of portions of the tube 4 corresponding to the thermosensitive element covering region 21 and the electric wire covering region 22, and to adjust the wall thicknesses of the resins covering the thermosensitive element 10 and the lead wires 15. For example, a wall thickness tt1 (FIG. 1B) in the z-direction of the thermosensitive element covering region 21 at a position where the sealing body 122 has the maximum dimension and a wall thickness tt2 (FIG. 1B) in the z-direction of the electric wire covering region 22 at the position of the insulation coverings 15B can be set equivalent to each other.

Even in a case where the tube 4 is not in tight contact with the thermosensitive element 10 only by the thermal shrinkage of the tube 4 by the heat processing, the inside of the tube 4 can be brought into tight contact with the thermosensitive element 10 by being strongly pressurized on the thermosensitive element 10 side by the pressurization processing. Further, a gap between the paired extension wires 121 and a gap between the paired core wires 15A can be filled with the resin of the tube 4 by the pressurization processing. This makes it possible to contribute to insulation ensurement and mechanical holding. Therefore, it is unnecessary to insert the extension wires 121 into sheaths made of an insulation material, and to form insulation coverings of the joint portions 13.

The resins moved to a front end 4F and a rear end 4B of the tube 4 by the pressurization processing respectively form end surfaces 201 and 202 in the x-direction by being shaped by an inner wall 501 of the mold 5 and a wall of an unillustrated mold. Therefore, even in a case where openings at the front end 4F and the rear end 4B of the tube 4 are not sufficiently closed only by the thermal shrinkage of the tube 4 by the heat processing, it is possible to tightly close the both openings of the tube 4, and to air-tightly and water-tightly seal the covered range 14 of the temperature sensor 1 inside the tube 4. In particular, the opening at the front end of the tube 4 can be reliably closed by the resin moved forward from the thermosensitive element 10 side that is more strongly pressurized.

If the covering body 20 is formed by injection molding, the thermosensitive element significantly moves inside the high-temperature/high-pressure mold. In contrast, by the method in which the thermosensitive element 10 is disposed inside the tube 4 and the tube 4 is pressurized after being heated, according to the present embodiment, the thermosensitive element 10 does not move unlike the injection molding, and the temperature sensor can be manufactured with high yield while avoiding damage of the thermosensitive element 10.

After the pressurization processing ends, the temperature sensor 1 provided with the covering body 20 is removed from the mold 5 (product removal step).

The temperature sensor 1 manufactured through the above-described steps can be attached to an appropriate supporting member such that, for example, a flat surface 21S of the thermosensitive element covering region 21 comes into contact with a flat surface of the temperature measurement object 3. It is possible to cause the surface 21S of the thermosensitive element covering region 21 to follow the surface of the object 3 and to bring the surface 21S of the thermosensitive element covering region 21 into surface contact with the surface of the object 3.

Rigidity in the z-direction of the thermosensitive element covering region 21 is smaller than rigidity in the z-direction of the electric wire covering region 22 because of difference between the thickness t1 of the thermosensitive element covering region 21 and the thickness t2 of the electric wire covering region 22. Accordingly, when the temperature sensor 1 is installed on the object 3, it is possible to deform the thermosensitive element covering region 21 in the z-direction and to sufficiently bring the thermosensitive element covering region 21 into surface contact with the object 3.

Further, the rigidity in the y-direction of the thermosensitive element covering region 21 is greater than rigidity in the z-direction of the thermosensitive element covering region 21 because of the difference between the width w1 and the thickness t1 of the thermosensitive element covering region 21. This makes it possible to suppress positional deviation with the object 3 caused by deformation in the y-direction of the thermosensitive element covering region 21. When the thermosensitive element covering region 21 is sandwiched between the object 3 and an unillustrated member facing the object 3 in the z-direction or when the thermosensitive element covering region 21 is pressed in the z-direction against the object 3 by unillustrated pressing means such as a spring, the thermosensitive element covering region 21 is hardly deformed in the z-direction. Specific examples of the object 3 include a stator coil of a motor provided in a vehicle. In this case, the thermosensitive element covering region 21 inserted between coil strands intersecting each other is positioned in the z-direction by being pressed between the coil strands. In addition, the object 3 may be an electric wire of an on-vehicle battery, a bus bar of an on-vehicle apparatus, or the like.

Main Effects of Present Embodiment

In the temperature sensor 1 according to the present embodiment described above, the thickness t1 of the thermosensitive element covering region 21 is thinner than the thickness t2 of the electric wire covering region 22. Therefore, as compared with a covering body that has a constant thickness from the thermosensitive element 10 side to the lead wire 15 side with the outer diameter of each of the lead wires 15 as a reference, a heat capacity of the covering body 20 is small, and the wall thickness of the covering body 20 between the thermosensitive body 11 and the object 3 is thin. As a result, heat is rapidly conducted from the object 3 to the thermosensitive body 11, which makes it possible to detect temperature change of the object 3 by the thermosensitive body 11 with higher sensitivity. In other words, responsiveness of the temperature sensor 1 can be improved.

Further, in the covering body 20 according to the present embodiment, the width of the thermosensitive element covering region 21 is narrower than the width of the electric wire covering region 22, and the heat capacity is smaller than a heat capacity of the covering body having a constant width. This also makes it possible to contribute to improvement in responsiveness.

The temperature sensor 1 is manufactured through the heat processing and the pressurization processing of the tube 4. Therefore, even when the tube 4 having the constant diameter is used, it is possible to easily form the covering body 20 different in thickness between the thermosensitive element 10 side and the lead wires 15 side, by compressive deformation of the tube 4 in addition to thermal shrinkage of the tube 4.

It is also possible to form the covering body 20 from two tubes different in diameter. In this case, however, it is necessary to insert the thermosensitive element 10 into a thin tube, and to insert the lead wires 15 into a thick tube. This complicates the manufacturing steps. In addition, sealing between the thin tube and the thick tube and filling of the gap between the electric wires disposed inside the thin tube with the resin may become insufficient. As in the present embodiment, using the tube 4 as the single member continuously disposed over the thermosensitive element 10 side and the lead wires 15 side makes it possible to reliably seal the entire covered range 14 of the thermosensitive element 10 and the lead wires 15 in the covering body 20.

The manufacturing method using the tube 4 according to the present embodiment makes it possible to provide the temperature sensor 1 that has durability and stable quality while the manufacturing cost is suppressed by reduction of the number of parts and simplification of the manufacturing steps.

Further, since the thickness t1 of the thermosensitive element covering region 21 is thinner than the thickness t2 of the electric wire covering region 22, it is possible to dispose the thermosensitive element 10 in a narrow place. This makes it possible to improve installation flexibility of the temperature sensor 1.

The surface 21S of the thermosensitive element covering region 21 is formed flat. Therefore, for example, unlike a case where an arc-shaped surface of the thermosensitive element covering region is in line contact with the flat surface of the object 3, it is possible to stably bring the thermosensitive element covering region 21 into surface contact with the flat surface of the object 3. Accordingly, it is possible to easily dispose the temperature sensor 1 on the object 3 while eliminating variation of the temperature measurement characteristics of the temperature sensor 1.

Further, heat can be received from the object 3 over a region where the thermosensitive element covering region 21 and the object 3 are in surface contact with each other, and the heat can be conducted to the thermosensitive body 11. Therefore, a heat reception amount is increased as compared with the case where the surface of the thermosensitive element covering region 21 is in line contact with the surface of the object 3, which makes it possible to contribute to improvement in measurement accuracy of the temperature sensor 1.

Since the width of the thermosensitive element covering region 21 is narrower than the width of the electric wire covering region 22, it is possible to install the temperature sensor 1 in a place having a narrow width. In addition, the heat capacity of the covering body 20 can be reduced because the width of the thermosensitive element covering region 21 is narrow. This makes it possible to contribute to improvement in responsiveness.

Examples in which the temperature sensor 1 according to the present embodiment was manufactured from the thermosensitive element 10 and the tube 4 by the above-described manufacturing method and a thermal time constant was measured are described.

Measurement Example 1

A thermal time constant (63.2% response) of the temperature sensor 1 according to a measurement example 1 was about 3.2 seconds that was an average value of a plurality of measurement values. In contrast, a thermal time constant of a temperature sensor according to a comparative example 1 that was manufactured by SHIBAURA ELECTRONICS CO., LTD., and included the thermosensitive element and the lead wires same as the thermosensitive element 10 and the lead wires 15 in the measurement example 1 and a covering body covering the thermosensitive element and the lead wires, was about 4 seconds. The covering body according to the comparative example 1 was formed with a constant thickness and a constant width from the thermosensitive element side to the lead wire 15 side.

In both of the measurement example 1 and the comparative example 1, the measurement was performed in such a manner that the temperature sensor left at a room temperature was put in water that was heated to 80° C. and stirred, and a temperature measurement value was continuously acquired.

Measurement Example 2

The temperature sensor 1 according to a measurement example 2 included the thermosensitive element 10 smaller in size than the thermosensitive element 10 of the temperature sensor 1 according to the measurement example 1. A thermal time constant (63.2% response) of the temperature sensor 1 according to the measurement example 2 was about 1.8 seconds that was an average value of a plurality of measurement values. In contrast, a thermal time constant of a temperature sensor according to a comparative example 2 that was manufactured by SHIBAURA ELECTRONICS CO., LTD., and included the thermosensitive element and the lead wires same as the thermosensitive element 10 and the lead wires 15 in the measurement example 2 and a covering body covering the thermosensitive element and the lead wires, was about 2 seconds. The covering body according to the comparative example 2 was formed with a constant thickness and a constant width from the thermosensitive element side to the lead wire side.

In both of the measurement example 2 and the comparative example 2, the measurement was performed under a condition similar to the above.

(Improvement Example of Tube Used for Manufacturing)

Figure 5:
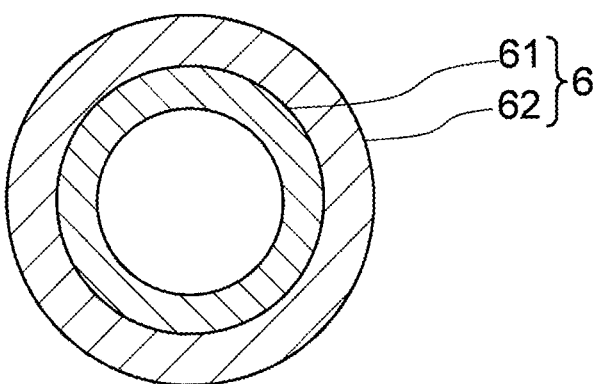
FIG. 5 is a diagram illustrating a tube having a two-layer structure including an inner layer and an outer layer as an improvement example of a material of a covering body.

The tube 4 as a material to form the covering body 20 may have a two-layer structure including an inner layer and an outer layer that is higher in melting point than the inner layer and has heat shrinkability as disclosed in JP 5830636 B2. FIG. 5 illustrates a tube 6 having a two-layer structure including an inner layer tube 61 as an inner layer and an outer layer tube 62 as an outer layer. The inner layer tube 61 is made of, for example, PFA. The outer layer tube 62 including an inner diameter corresponding to an outer diameter of the inner layer tube 61 is made of, for example, PTFE.

In the heat processing during the manufacturing process, when the outer layer tube 62 and the inner layer tube 61 are heated to a temperature between a melting point (302° ° C. to 310° C.) of PFA and a melting point (327° C.) of PTFE, for example, 315° C., the inner layer tube 61 is thermally shrunk and is then melted, whereas the outer layer tube 62 is thermally shrunk without being melted.

An inner diameter and the outer diameter of the inner layer tube 61 are set such that the covered range 14 of the thermosensitive element 10 and the lead wires 15 is sealed in the inner layer tube 61 after melting and solidification of the inner layer tube 61. The inner diameter and an outer diameter of the outer layer tube 62 are set such that pressurizing force by thermal shrinkage is applied to the inner layer tube 61 in the melted state.

The resin of the inner layer tube 61 melted by the heat processing sufficiently enters the gap between the extension wires 121 and the gap between the joint portions 13 by being pressed by the thermal shrinkage of the outer layer tube 62 and the press processing.

The melted resin of the inner layer tube 61 is solidified by heat dissipation in the pressurization step in a state of entering the gap between the extension wires 121 and the gap between the joint portions 13 without a gap. Therefore, the thermosensitive element 10 is more sufficiently sealed by the inner layer tube 61 from the front end 10F of the thermosensitive element 10 to the joint portions 13, and insulation between the electric wires is more sufficiently secured by the inner layer tube 61.

Further, when the melted resin of the inner layer tube 61 is solidified in the cavity of the mold so as to have a rectangular cross-section, the outer layer tube 62 is joined with the inner layer tube 61 without a gap, and is maintained in a rectangular shape by being restrained by the inner layer tube 61 from the inside. As a result, the gap between the tubes 61 and 62 is sealed, and the flat surface of the formed covering body 20 can be maintained after the press processing.

MODIFICATIONS

Various modifications of the present invention are described below. Components similar to the components according to the above-descried embodiment are denoted by the same reference numerals.

(Modifications of Covering Body)

Figure 6A:
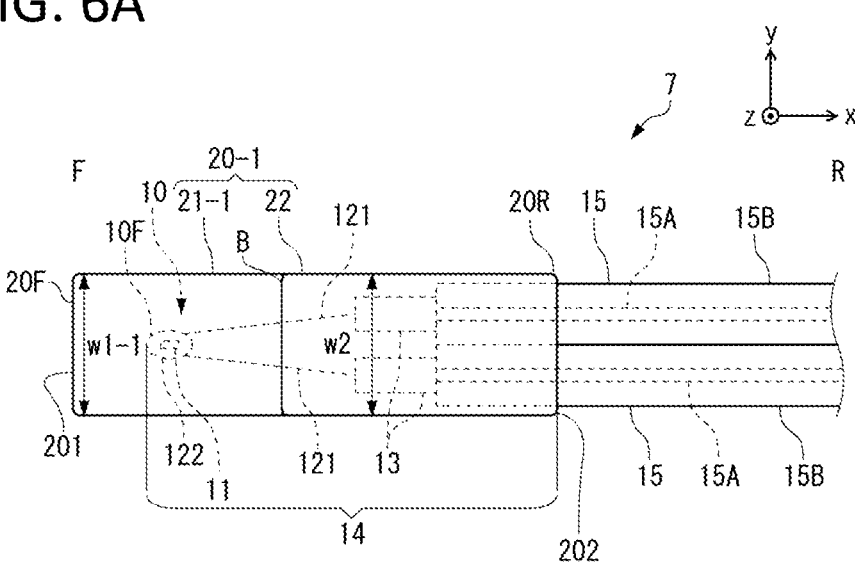
FIG. 6A and FIG. 6B are diagrams illustrating a temperature sensor according to a modification of the present invention, FIG. 6A being a plan view, and FIG. 6B being a side view.
Figure 6B:
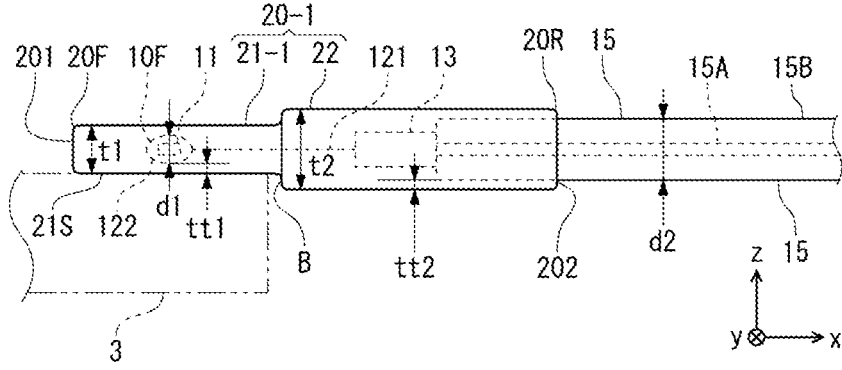

As illustrated in FIG. 6A and FIG. 6B, a width of a covering body 20-1 may be set to a constant width over the thermosensitive element 10 side and the lead wire 15 side. A width w1-1 of a thermosensitive element covering region 21-1 is equal to the width w2 of the electric wire covering region 22. Except for this point, a temperature sensor 7 has a configuration similar to the configuration of the temperature sensor 1 according to the above-described embodiment.

The temperature sensor 7 can be manufactured through the heat processing and the press processing using a mold corresponding to a shape of the covering body 20-1 in a manner similar to the procedure according to the above-described embodiment.

According to the configuration illustrated in FIG. 6A and FIG. 6B, a contact area of the covering body 20-1 with the surface of the object 3 can be expanded as compared with the case where the width w1 of the thermosensitive element covering region 21 is narrower than the width w2 of the electric wire covering region 22 as in the above-described embodiment. As a result, measurement accuracy can be further improved by expansion of an area where the covering body 20-1 receives heat from the object 3.

In addition, since the thickness t1 of the thermosensitive element covering region 21-1 is thinner than the thickness t2 of the electric wire covering region 22 as in the above-described embodiment, it is possible to improve responsiveness.

Figure 7A:
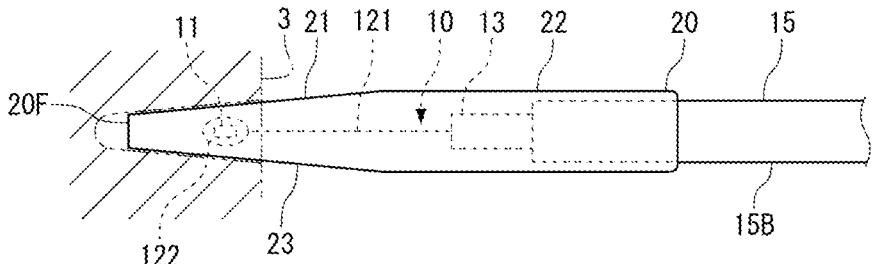
FIG. 7A to FIG. 7C are side views each illustrating a covering body according to another modification of the present invention.
Figure 7B:
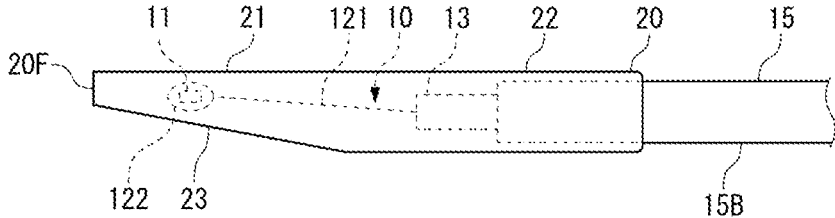
Figure 7C:
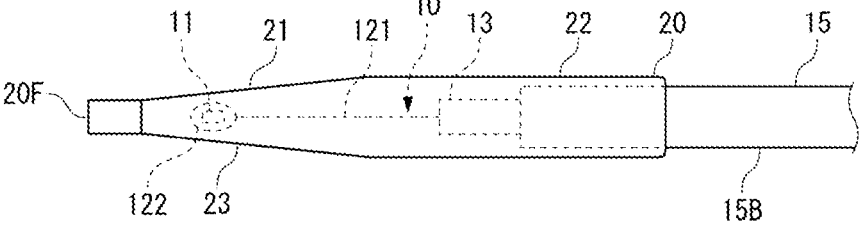

For example, as illustrated in FIG. 7A to FIG. 7C, the covering body 20 according to the above-described embodiment may include a tapered region (tapered portion 23) where the thickness is gradually reduced toward the end (front end 20F) of the covering body 20, at least in the thermosensitive element covering region 21.

The covering body 20 including the tapered portion 23 can be formed in a procedure similar to the procedure according to the above-described embodiment, by using a mold having a shape corresponding to the tapered portion 23 and the tube 4.

When the covering body 20 includes the tapered portion 23, the front-end side of the covering body 20 is particularly thin. Therefore, the temperature sensor can be easily installed on the object 3 by inserting the front-end side of the covering body 20 into, for example, a narrow groove. Further, by reduction in thickness of the tapered portion 23, the heat capacity is reduced as compared with the covering body 20 having the constant thickness. This makes it possible to contribute to improvement in responsiveness.

The tapered portion 23 can be adopted in the covering body 20-1 (FIG. 6A and FIG. 6B) according to the above-described modification.

Although not illustrated, the covering body 20 according to the above-described embodiment or the covering body 20-1 according to the above-described modification may include a portion where a width is gradually reduced toward the front end 20F, at least in the thermosensitive element covering region 21. The portion may be a region where the thickness is gradually reduced in addition to reduction of the width.

According to the embodiment and the modification described above, the thickness of the covering body on the thermosensitive element 10 side can be appropriately set based on a shape of an installation place such as a narrow groove and a wide gap, irrespective of the outer diameter of each of the lead wires 15. This makes it possible to improve installation flexibility of the temperature sensor.

In addition, the shape of the covering body can be appropriately modified based on the shape of the installation place and the like. For example, as illustrated in FIG. 8A, the thermosensitive element covering region 21 thinner than the electric wire covering region 22 may be disposed while being shifted in the z-direction, relative to the electric wire covering region 22. The position of the thermosensitive element covering region 21 may be shifted in a direction opposite to the direction illustrated in FIG. 8A, relative to the electric wire covering region 22.

In a case where the thermosensitive element covering region 21 and the electric wire covering region 22 are disposed while being shifted from each other, the thermosensitive element covering region 21 and the electric wire covering region 22 can be disposed on the same plane.

With shift of the thermosensitive element covering region 21 and the electric wire covering region 22, the position of the thermosensitive body 11 and the positions of the lead wires 15 are shifted in the z-direction. In the press processing, the extension wires 121 are displaced following the relative position of the thermosensitive body 11 and the lead wires 15. Therefore, the extension wires 121 obliquely extend in the z-direction to a line orthogonal to a paper surface of FIG. 8A.

As illustrated in FIG. 8B, the thermosensitive element covering region 21 may be shifted in the y-direction, relative to the electric wire covering region 22. Although not illustrated, the thermosensitive element covering region 21 may be shifted in the z-direction and the y-direction, relative to the electric wire covering region 22.

Figure 9A:
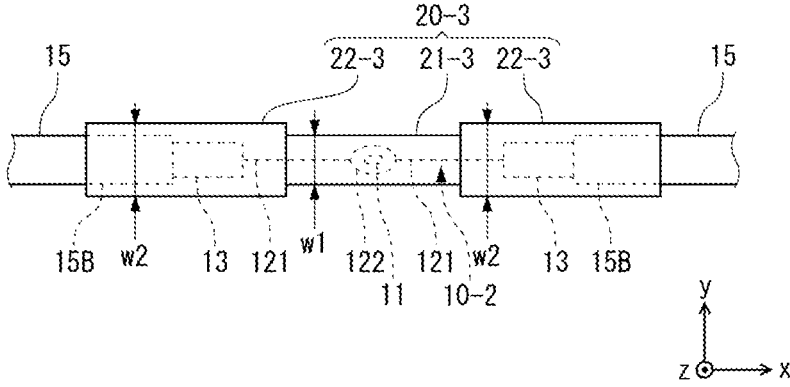
FIG. 9A and FIG. 9B are diagrams illustrating a temperature sensor according to still another modification of the present invention, FIG. 9A being a plan view, and FIG. 9B being a side view.
Figure 9B:
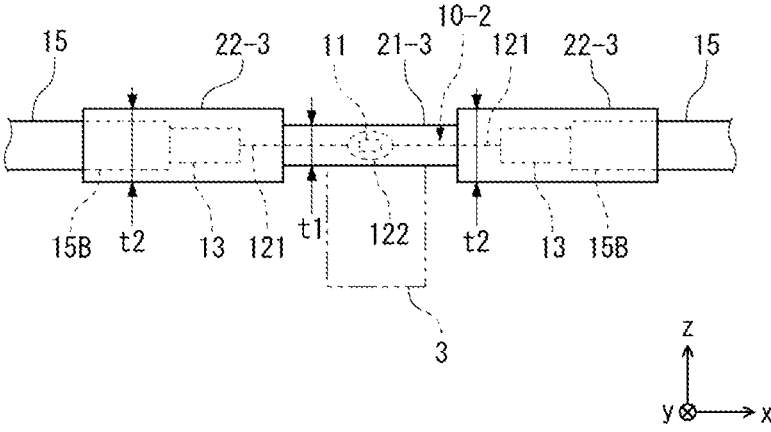

A covering body 20-3 illustrated in FIG. 9A and FIG. 9B is provided for a thermosensitive element 10-2 including the pared extension wires 121 drawn out from the thermosensitive body 11 to both sides in opposite directions, and the paired lead wires 15 connected to the respective extension wires 121. The covering body 20-3 includes a thermosensitive element covering region 21-3 that is formed in a rectangular-parallelepiped shape and covers the thermosensitive element 10, and paired electric wire covering regions 22-3 that are each formed in a rectangular-parallelepiped shape and cover the respective lead wires 15. The electric wire covering regions 22-3 are continuous with respective ends of the thermosensitive element covering region 21-3 in the x-direction. The thickness t1 of the thermosensitive element covering region 21-3 is thinner than the thickness t2 of each of the electric wire covering regions 22-3. Further, the width w1 of the thermosensitive element covering region 21-3 is narrower than the width w2 of each of the electric wire covering regions 22-3.

As in the above-described embodiment, the thickness of the resin layer on the thermosensitive element 10 side is thin, and the distance from the object 3 to the thermosensitive body 11 is small. This makes it possible to improve responsiveness to temperature change of the object 3.

(Modifications of Pressurization Processing)

Figure 10A:
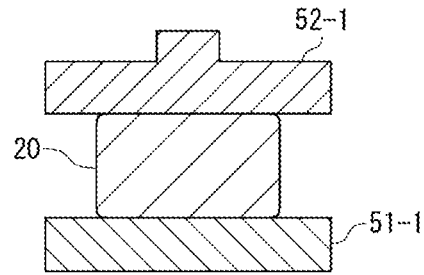
FIG. 10A and FIG. 10B are diagrams illustrating pressurization processing different from pressurization processing illustrated in FIG. 4C.

The mold used for the press processing does not necessarily have to pressurize the tube 4 from four directions of an up-down direction (z-direction) and a right-left direction (y-direction) as with the mold 5 according to the above-described embodiment. For example, as illustrated in FIG. 10A, the tube 4 is preferably pressurized between a lower mold 51-1 and an upper mold 52-1 each having a substantially plate shape. In each of the lower mold 51-1 and the upper mold 52-1, an unillustrated step corresponding to a thickness difference of the covering body 20 between the thermosensitive element 10 side and the lead wire 15 side is formed.

The pressurization processing is not limited to the press processing. For example, as illustrated in FIG. 10B, the covering body 20 in which the thickness on the thermosensitive element 10 side and the thickness on the lead wire 15 side are different from each other can be obtained by using a roll forming apparatus 80.

For example, when a material of the covering body 20 housing the thermosensitive element 10 and parts of the lead wires 15 is passed between paired rolls 81 disposed with an interval corresponding to the thickness t2, and the material of the covering body 20 is pressurized by the paired rolls 81, an intermediate material 4M compressed and deformed to the thickness t2 is obtained. When the thermosensitive element 10 side of the intermediate material 4M is passed between paired rolls 82 disposed with an interval corresponding to the thickness t1 in the y-direction, and is pressurized by the paired rolls 82, a covering body including the thermosensitive element covering region 21 with the thickness t1 and the electric wire covering region 22 with the thickness t2 can be obtained. A dimension of each of the rolls 82 in an axial direction corresponds to a length of the thermosensitive element covering region 21 in the x-direction.

Figure 10B:
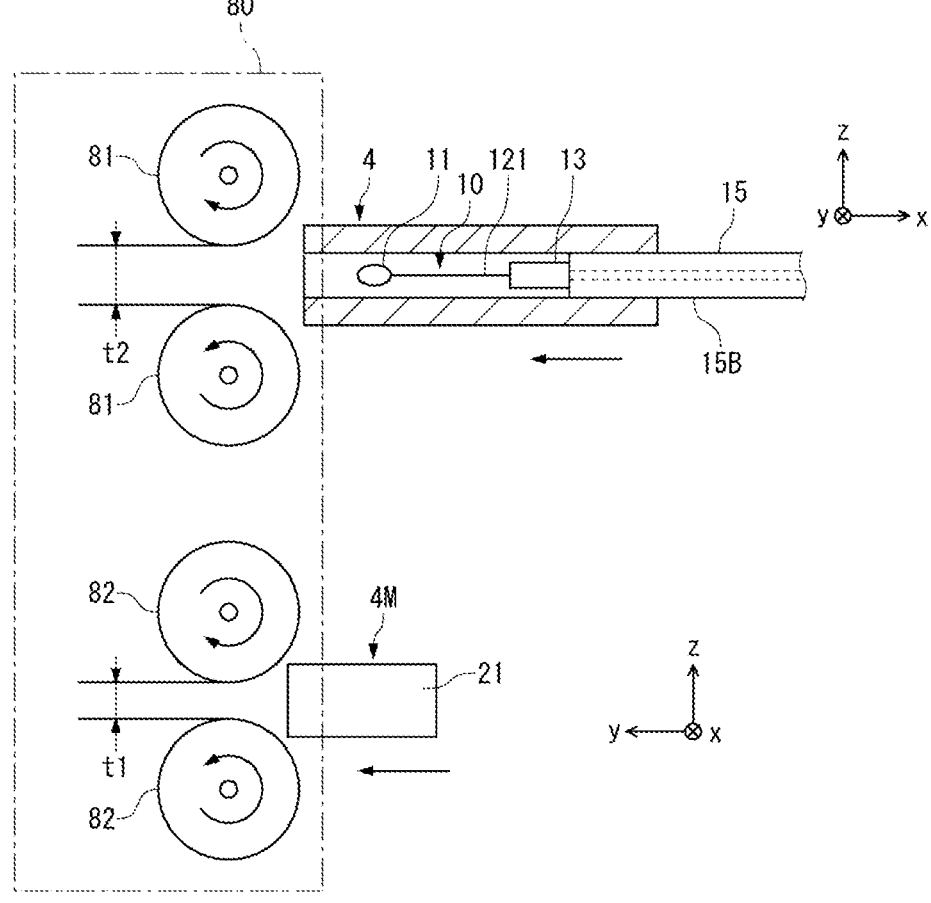

As compared with the pressurization method in FIG. 10A and FIG. 10B, in the present embodiment, the tube 4 that is the material of the covering body 20 can be pressurized from the four directions of the up-down direction and the right-left direction by the mold 5 (FIG. 4A to FIG. 4C). This is excellent in filling of the gap between the extension wires 121 and the gap between the joint portions 13 with the resin. [Modification of Material of Covering Body]

The tube 4 (FIG. 3A to FIG. 3C) used as the material of the covering body 20 and the like does not necessarily have heat shrinkability. For example, the covering body 20 and the like can be formed by pressurizing, by press processing and the like, the tube softened and expanded by heating.

The covering body 20 can be formed by performing press-processing on a stacked body including a plurality of (for example, three or more) sheets each made of PTFE.

The material of the covering body 20 and the like is not limited to the cylindrical tube 4. For example, the covering body 20 and the like can be formed by housing the thermosensitive element 10 and parts of the lead wires 15 between paired half bodies that are divided from the tube 4 along the axial direction, and then performing the heat processing and the pressurization processing.

Other than the above, the configurations described in the above-described embodiment can be selected or appropriately modified to other configurations without departing from the spirit of the present invention.

The thickness t1 of the thermosensitive element covering region 21 may be equal to the thickness t2 of the electric wire covering region 22, and the width w1 of the thermosensitive element covering region 21 may be narrower than the width w2 of the electric wire covering region 22. In this case, when one surface of the thermosensitive element covering region 21 orthogonal to the y axis is disposed on the object 3, the thermosensitive body 11 can be brought close to the object 3 as compared with the case where the widths w1 and w2 are equal to each other. This makes it possible to improve responsiveness.

REFERENCE SIGNS LIST

1, 7 Temperature sensor
3 Object
4, 6 Tube (material)
4B Rear end
4F Front end
4M Intermediate material
5 Mold
10 Thermosensitive element
10F Front end
11 Thermosensitive body
13 Joint portion
14 Covered range
15 Lead wire
15A Core wire
15B Insulation covering
20 Covering body
20F Front end
20R Rear end
21 Thermosensitive element covering region
21S Surface
22 Electric wire covering region
23 Tapered portion
50 Cavity
51 Lower mold
52 Upper mold
61 Inner layer tube
62 Outer layer tube
80 Roll forming apparatus
81, 82 Roll
121 Extension wire
122 Sealing body
201, 202 End surface
501 Inner wall
502, 503 Step
B Boundary
d1 Dimension of outer shape
d2 Outer diameter
H Heat
P Pressure
S00 Lead wire joining step
S01 Thermosensitive element housing step
S02 Heating step
S03 Pressure forming step
t1, t2 Thickness
tt1, tt2 Wall thickness
w1, w2 Width
X1, X2 Center
x Direction (longitudinal direction, drawing direction, front-rear direction)
y Direction (lateral direction, width direction, second direction)
z Direction (lateral direction, thickness direction, first direction)

The invention claimed is:
1. A temperature sensor, comprising:
a thermosensitive element including a thermosensitive body, an extension wire having one end electrically connected to the thermosensitive body, and a sealing body that is made of an insulation material and covers a part of the extension wire and the thermosensitive body;

a lead wire electrically connected to another end of the extension wire of the thermosensitive element; and a covering body that is made of a resin and has a long shape and a rectangular cross-section, the covering body covering a part of the lead wire and the thermosensitive element, wherein in a first direction in the rectangular cross-section of the covering body, a thickness of a region of the covering body covering the thermosensitive element is set less than a thickness of a region of the covering body covering the lead wire, in a second direction orthogonal to the first direction in the rectangular cross-section of the covering body, the thickness of the region of the covering body covering the thermosensitive element is set less than the thickness of the region of the covering body covering the lead wire, the region of the covering body covering the thermosensitive element is formed in a rectangular-parallelepiped shape, and each of the region of the covering body covering the thermosensitive element and the region of the covering body covering the lead wire have a rectangular cross-section having a constant thickness in the first direction and a constant thickness in the second direction, and wherein a boundary is formed between the region of the covering body covering the thermosensitive element and the region of the covering body covering the lead wire.

2. The temperature sensor according to claim 1, wherein the lead wire includes a core wire connected to the extension wire and a covering provided around the core wire, and in the first or second direction of the covering body, the thickness of the region of the covering body covering the thermosensitive element is set less than an outer diameter of the covering of the lead wire.

3. The temperature sensor according to claim 1, wherein the region of the covering body covering the lead wire is formed in a rectangular-parallelepiped shape.

4. The temperature sensor according to claim 1, wherein a pair of the extension wires of the thermosensitive element are drawn out toward one side from the thermosensitive body, the sealing body is disposed in the region of the covering body covering the thermosensitive element, and a joint portion of each of the extension wires and the respective lead wire is disposed in the region of the covering body covering the lead wire.

5. The temperature sensor according to claim 4, wherein a center of the cross-section of the region of the covering body covering the thermosensitive element and a center of the cross-section of the region of the covering body covering the lead wire are coincident with each other.

6. The temperature sensor according to claim 4, wherein the thickness in the first or second direction of the region of the covering body covering the thermosensitive element is reduced toward an end of the covering body.

7. A method of manufacturing a temperature sensor, the temperature sensor including a thermosensitive element including a thermosensitive body, a lead wire connected to the thermosensitive element, and a covering body that is made of a resin and has a long shape, the covering body covering a part of the lead wire and the thermosensitive element, the method comprising:

a housing step of housing the part of the lead wire and the thermosensitive element inside a material made of a resin;

a heating step of heating the material; and a pressure forming step of pressurizing the material to form the material in a shape having a rectangular cross-section, wherein in the pressure forming step, in a first direction in the rectangular cross-section of the covering body and in a second direction orthogonal to the first direction in the rectangular cross-section of the covering body, a thickness of a region of the covering body covering the thermosensitive element is set less than a thickness of a region of the covering body covering the lead wire by deforming, by pressurization, the material on the thermosensitive element side by a deformation amount greater than a deformation amount of the material on the lead wire side, the region of the covering body covering the thermosensitive element is formed in a rectangular-parallelepiped shape, and each of the region of the covering body covering the thermosensitive element and the region of the covering body covering the lead wire have the rectangular cross-section having a constant thickness in the first direction and a constant thickness in the second direction, and wherein a boundary is formed between the region of the covering body covering the thermosensitive element and the region of the covering body covering the lead wire.

* * * * *